Aug. 6, 1963 G. P. HEILMAN ETAL 3,099,837
PNEUMATIC DRIVER
Filed Sept. 17, 1959 5 Sheets-Sheet 1
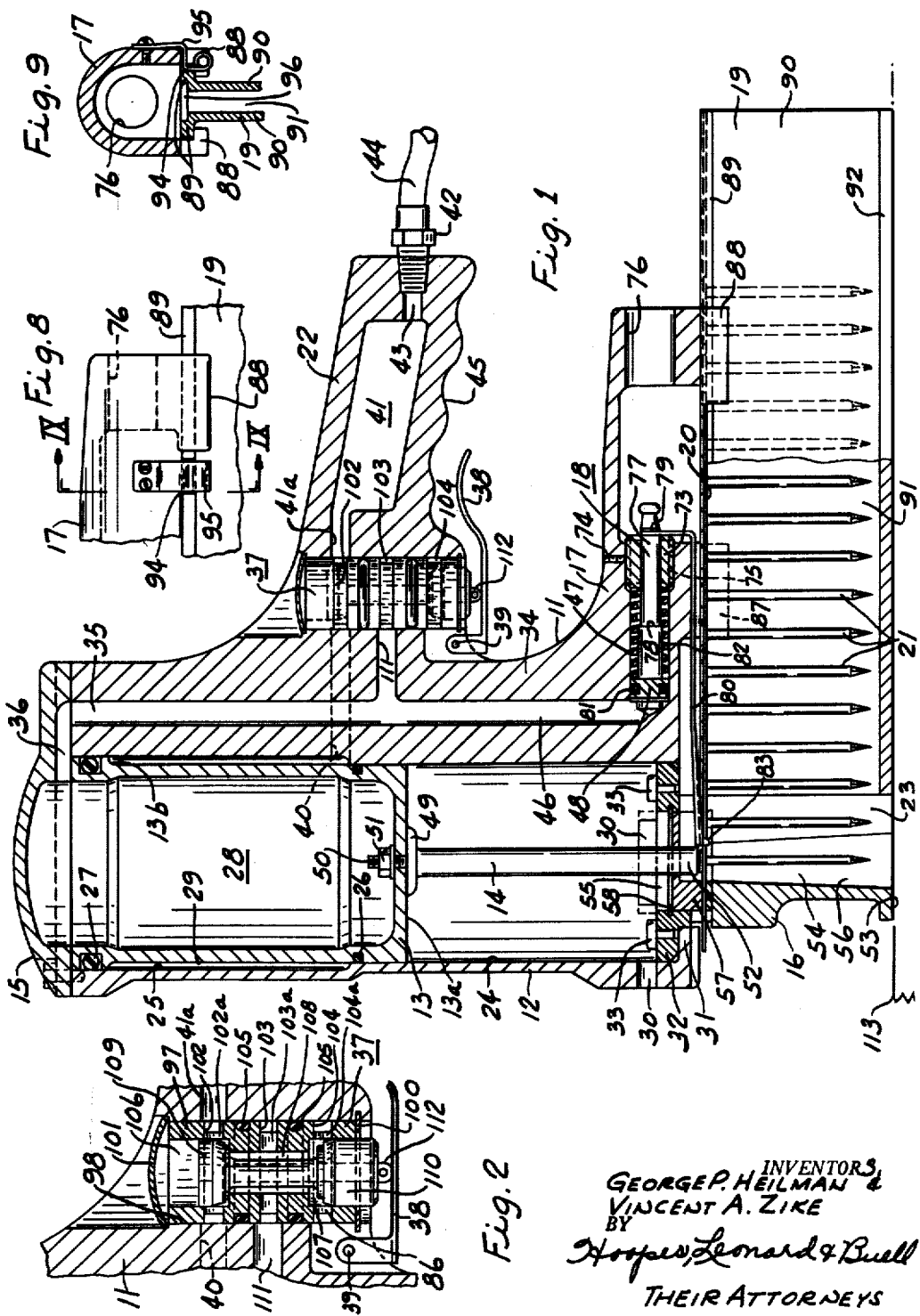
INVENTORS
GEORGE P. HEILMAN &
VINCENT A. ZIKE
BY
Hooper, Leonard & Buell
THEIR ATTORNEYS

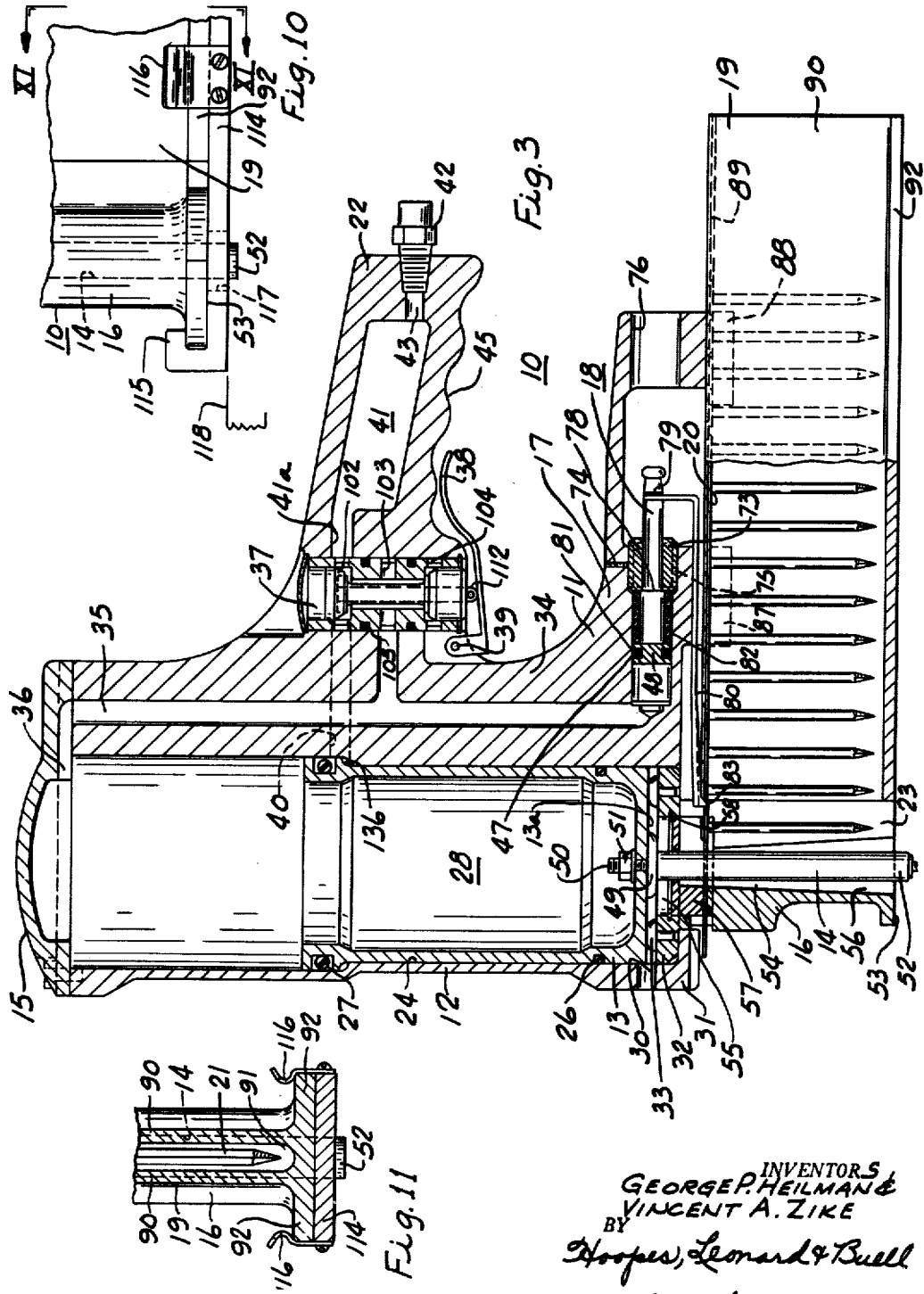

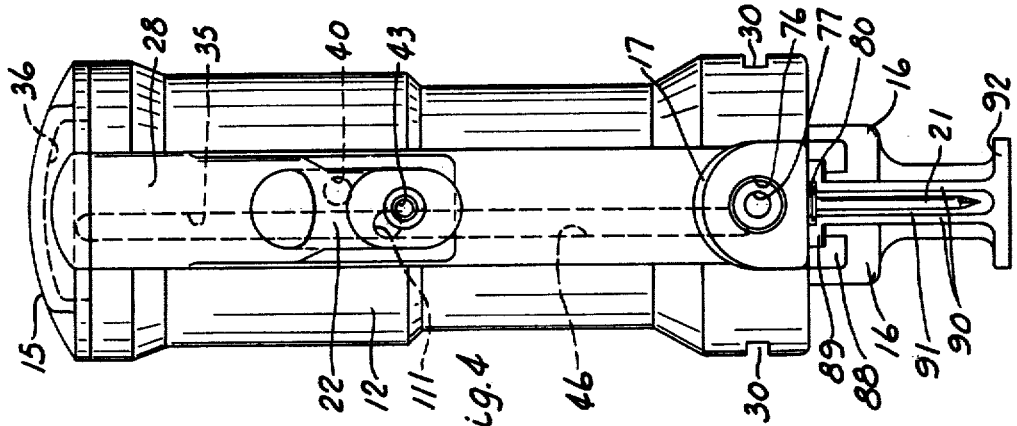
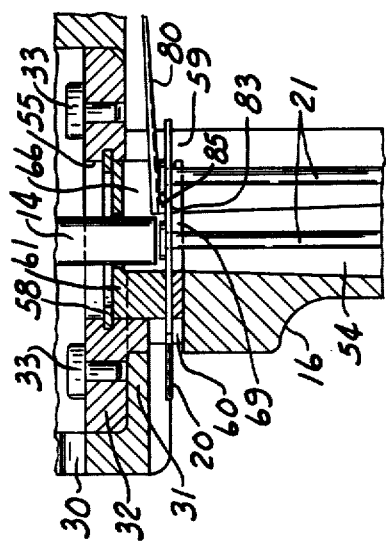
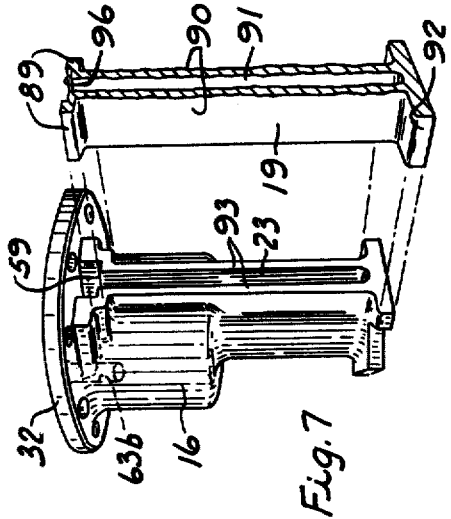
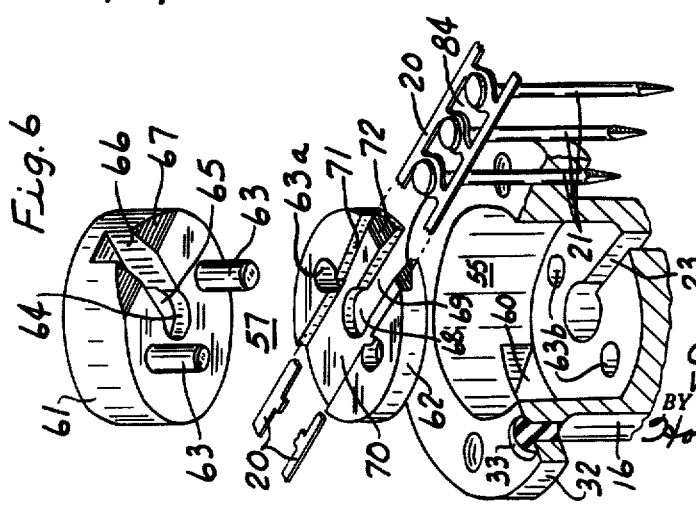

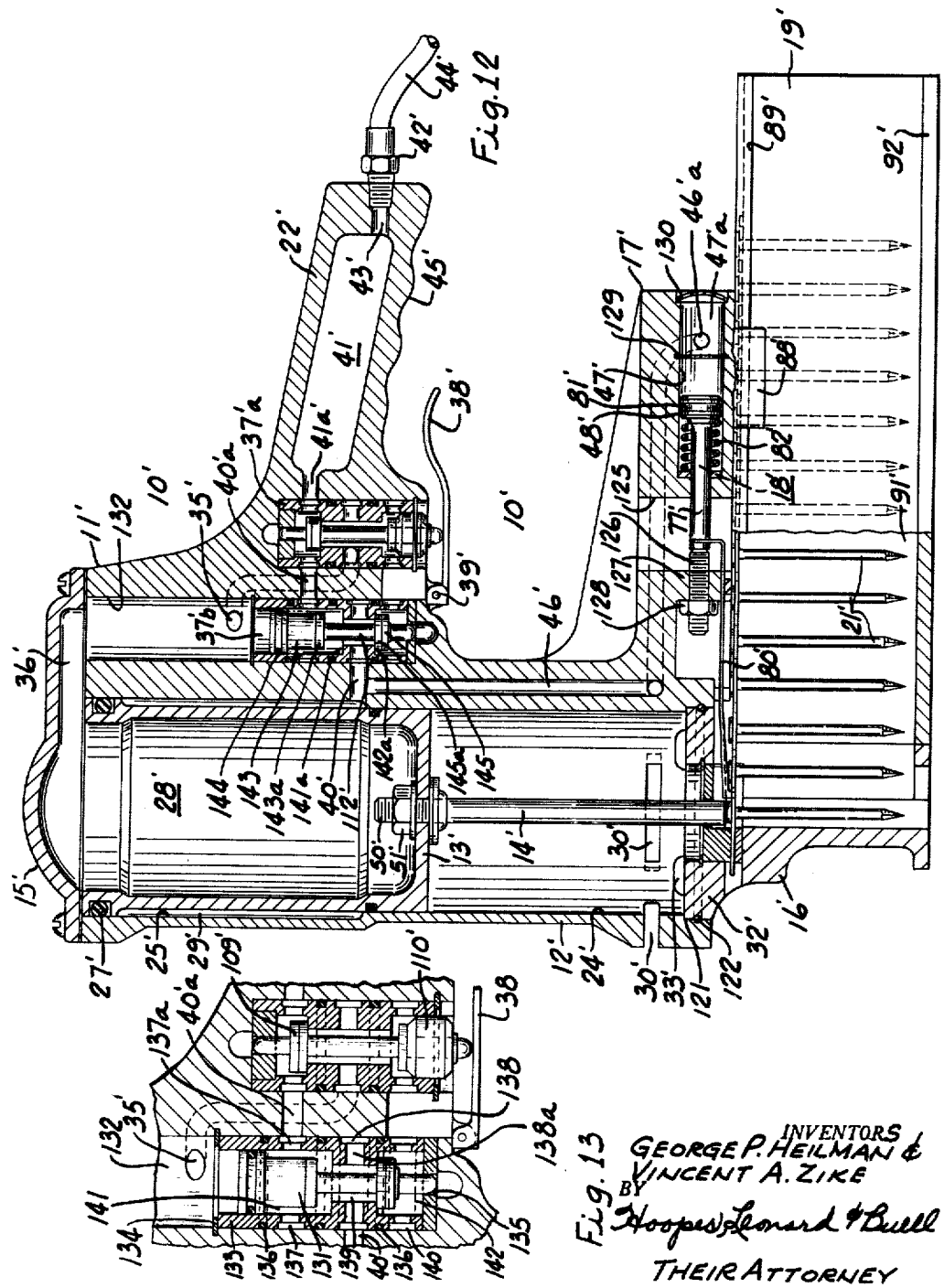

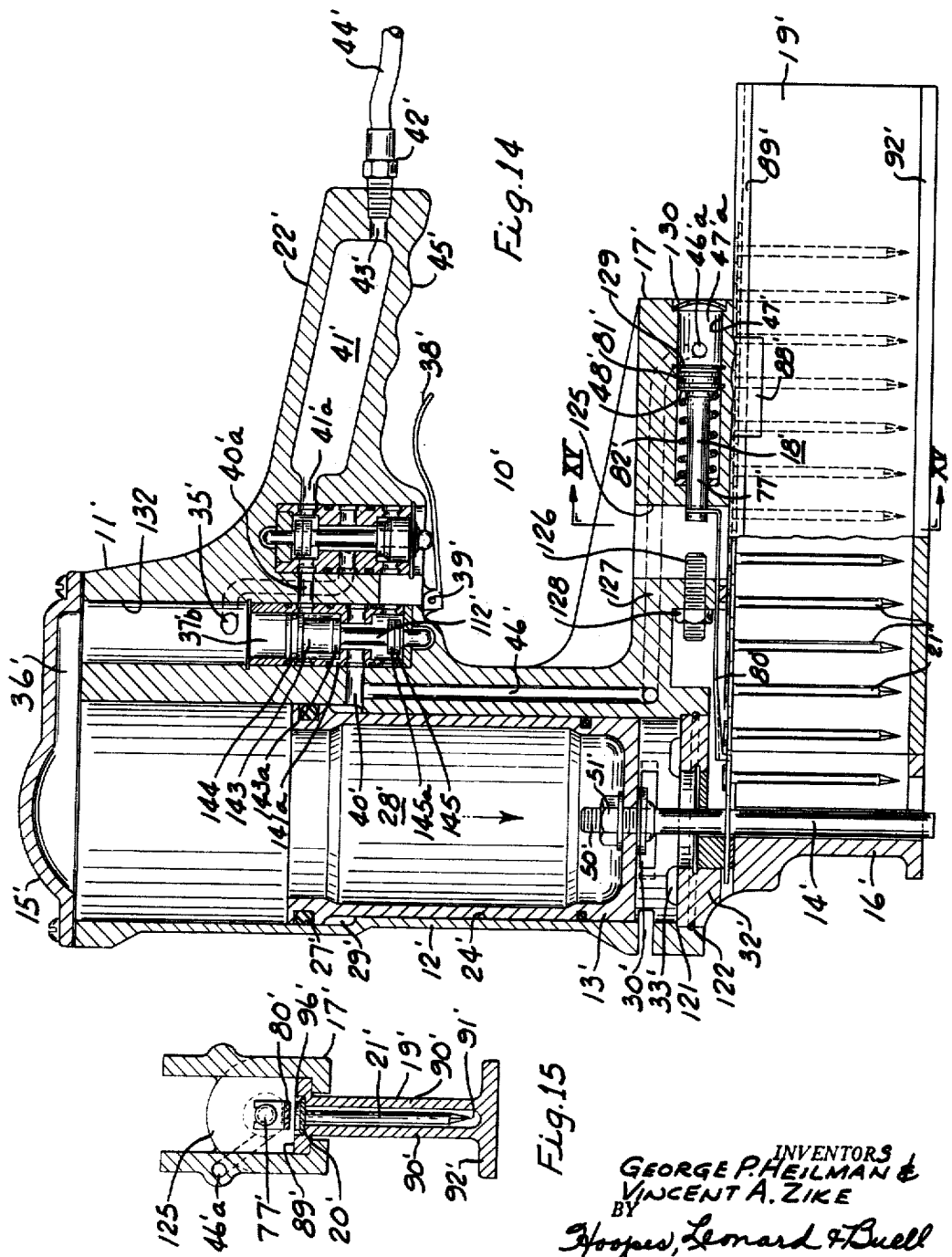

United States Patent Office 3,099,837
Patented Aug. 6, 1963

3,099,837
PNEUMATIC DRIVER
George P. Heilman and Vincent A. Zike, Herrin, Ill., assignors to International Staple and Machine Company, Pittsburgh, Pa., a corporation of Pennsylvania
Filed Sept. 17, 1959, Ser. No. 840,613
4 Claims. (Cl. 1—44.4)

This invention relates to a pneumatic driver for nails, spikes, brads and other fasteners capable of being driven by a sharp, fast blow. More particularly, this invention pertains to a driver having a piston-driven plunger or blade which drives with a single blow and in which the piston is advanced and returned by pneumatic pressure.

The instant invention provides a pneumatic driver which is relatively smaller and less complicated than prior devices. Moreover, such driver promotes maximum use of the kinetc energy potential in the pneumatic fluid, preferably compressed air, used as the motive force. The piston in such driver is reciprocated by positive pneumatic pressure both in the course of a driving stroke and in the course of a return stroke. Preferably, the return stroke is accomplished utilizing a smaller effective piston area than the piston area utilized on the driving stroke and the operation and maintenance of such a driver is relatively economical. The parts thereof may be made by modern present-day manufacturing methods so as to be readily used on an interchangeable basis. Drivers of this invention may be utilized for fastener driving or for nonfastening blow purposes without throwing the driver in the hands of the operator when it is manually held. It is capable of being used for varying types and sizes of nails and other fasteners to be driven thereby when such are fed thereto preferably in a continuous strip form. And means may be made available therein for varying the blow delivered by such a driver so that it may be utilized on different kinds of work.

Other objects, features and advantages of this invention will be apparent from the following description and the accompanying drawings, which are illustrative only, in which:

FIGURE 1 is a view in longitudinal section of one embodiment of a pneumatic driver of this invention in an at rest position;

FIGURE 2 is an enlarged detail view of the control valve shown in FIGURE 1;

FIGURE 3 is a view in longitudinal section of the driver shown in FIGURE 1 with the trigger depressed and the driving plunger at the end of a driving stroke;

FIGURE 4 is an end view of the driver shown in FIGURE 1;

FIGURE 5 is an enlarged detail view of the area around the bottom of the driving cylinder shown in FIGURE 1;

FIGURE 6 is an exploded view of the guide die subassembly utilized in the driver of FIGURE 1;

FIGURE 7 is an exploded view of nose and magazine parts utilized in the driver of FIGURE 1;

FIGURE 8 is a detail view of a portion of the outside of the bracket on the body of the driver shown in FIGURE 1 to show one means for holding the magazine;

FIGURE 9 is a view in section taken along line IX—IX of FIGURE 8;

FIGURE 10 is a view of the lower front part of the driver shown in FIGURE 3 with a member attached thereto to vary the blow delivered by the driver;

FIGURE 11 is a view in section taken along line XI—XI of FIGURE 10;

FIGURE 12 is a view in longitudinal section of a further embodiment of this invention in an at rest position;

FIGURE 13 is an enlarged detail view of the control valve assembly shown in FIGURE 12;

FIGURE 14 is a view in longitudinal section of such further embodiment with the trigger depressed and the driving plunger at the end of a driving stroke; and FIGURE 15 is a view in section taken along line XV—XV of FIGURE 14.

FIGURES 1 to 9 of the drawings illustrate one embodiment of a pneumatic driver 10 of this invention having a body 11 embracing a cylinder 12 for the reciprocation therein of a piston 13 to which a driving member 14, in the form of a plunger, is secured. A cap 15 closes the top of the body and cylinder 12 while a nose piece 16 is secured to the bottom of cylinder 12. A bracket 17 contains a feeder subassembly 18 and holds a magazine 19, in registry with nose 16, for a strip 20 carrying spaced fasteners 21, shown as nails to be driven by driver 10. Bracket 17 extends to the rear and is shown as an integral portion of a casting of body 11 although it may be connected thereto, as may a hollow handle 22 in superposed relation to bracket 17. Magazine 19 is in the form of a channel and extends to the rear beneath bracket 17 where it is removably latched in place on body 11 with the front of the magazine in alignment with a rear passage 23 in nose piece 16.

Cylinder 12 comprises a driving bore 24 and a somewhat larger diameter return counterbore 25 in stepped relation to bore 24. Piston 13 is generally U-shaped and in contact at all times with the walls of both bores, a lower piston ring portion 26 in the form of an O-ring engaging the wall of bore 24 and an upper piston ring 27 in the form of an O-ring engaging the wall of bore 25. Terms used in this description such as "upper" and "lower," "top" and "bottom," "front" and "rear," "horizontal" and "vertical," "longitudinal" and "transverse," are used in a relative sense in connection with the illustrated embodiments rather than in any absolute or directional sense relative to the center of the earth.

The interior of piston 13 comprises a cup-shaped recess 28 having a much greater cross-sectional area than the cross-sectional area of the annulus 29 between the outside of piston 13 and the wall of counterbore 25. Bore 24 beneath the bottom of piston 13 is unrestrictedly open to atmosphere through ports 30 extending through the outer walls of body 11 around the front and sides of cylinder 12. An internal arcuate flange 31 acts as a seat for a round flanged head 32 on nose piece 16 which is fastened to flange 31 by bolts extending upwardly therethrough into drilled and tapped holes along the sides of head 32. Rubber buttons 33 mounted on the top of head 32 serve as bumper cushions for the end of the downward driving stroke of piston 13. A rear vertical rib 34 in body 11 is provided with a passage 35 which is continued by an extension passage 36 in cap 15 to communicate with recess 28 whenever compressed air is admitted thereto through a control valve subassembly 37 actuated by a trigger 38 pivotally connected at 39 to body 11.

A return passage 40 in body 11 to one side of passage 35 constantly connects annulus 29 with the pressure air always available in the interior 41 of handle 22. A pneumatic pressure fluid such as compressed air is supplied to interior 41 by means of a fitting 42 and an opening 43, such compressed air being supplied through a flexible hose 44 to the fitting so the driver may be moved about at will and used as a portable tool when desired, or the driver may be fastened to a standard or other mechanism for use in place.

While the illustrated embodiment has annulus 29 constantly under pressure, compressed air is admitted to passage 35 and recess 28 to provide a driving stroke with piston 13 only when trigger 38 is pulled, as shown in FIGURE 3 by the index finger of the workman operating it. Handle 22 may be provided with finger indentations 45 for gripping convenience. When air is admitted to air passage 35, it is admitted at the same time to a feeder passage 46, the lower end of which communicates with the head end of a feeder cylinder 47 in which a feeder piston 48 of subassembly 18 reciprocates.

Plunger 14 is provided with a flange 49 and a threaded stud 50 at its upper end in such wise that the flange 49 seats rigidly and squarely against the bottom of piston 13 while stud 50 extends upwardly centrally through the bottom of piston 13 for affixation thereto by means of a nut and lock washer 51. Plunger 14 is shown in FIGURE 1 in its retracted or at rest position and in FIGURE 3 in its fully extended position at the bottom of a driving stroke with lower end 52 of plunger 14 projecting a short predetermined distance below a bottom face 53 on nose piece 16 and magazine 19. A vertically extending generally cylindrical plunger passage 54 extends through nose piece 16 with the upper portion 55 of that passage straight and of greater diameter and the lower portion 56 slightly diverging downwardly and of lesser diameter. A guide die 57 is seated in cylindrical recess portion 55 and retained by a retainer ring 58 engaging a groove in the wall of that recess.

Guide die 57 is provided with a through horizontal passage from front to rear for the nail strip 20, the nails 21 in which are centered successively beneath bottom 52 of plunger 14 for a nail driving action in the course of which the plunger shears the material of the strip to drive the nail beneath the plunger into the wood or other object into which such fastener is to be driven. Such opening through guide die 57 is in registry with a rear opening 59 in the head of the nose piece 16 for the whole nailing strip and with a front opening 60 in nose piece 16 through which the remainder of the nailing strip, not sheared away by plunger 14, moves as the nailing strip is advanced due in successive nail driving cycles. Opening 59 forms a general T-shape with passage 23 extending rearwardly from recess portion 56 so each nail 21 in strip 20 with its depending shank can be fed into passage 54 for a driving operation by a feeding movement of subassembly 18.

Guide die 57 comprises an upper block 61 having a lower block 62 held in vertical registry by pins 63 extending downwardly from block 61, through registration holes 63a in block 62 and into indexing holes 63b in nose 16. Block 61 is provided with a central opening therethrough with a close fitting central guide portion 64 at the bottom thereof and a larger coaxial counterbore portion 65 thereabove. An inverted U-shaped groove 66 extends from the rear of block 61 to intersect and open into central opening 64—65. The rear edge of the underside of block 61 is chamfered at 67 to each side of the sides of inverted groove 66. The bottom of block 61 sits on the top of block 62 which has a central die opening 68 therethrough and a cut-out portion 69 extending between the rear of opening 68 and the rear of block 62 in vertical alignment with passage 23 and groove 66. The upper portion of block 62 above die opening 68 and cut-out portion 69 is provided with a longitudinally extending guide groove 70, the sides of which at the front half of the groove are parallel while the side walls in portion 71 along the rear half of groove 70 taper in a forward direction. The floor of groove 70 is sloped downwardly and rearwardly at 72 to each side of the rear end of cutout portion 69. Hence, as nailing strip 20 is advanced by feeder 18, in step-by-step fashion, the strip will slide through guide die 57 in groove 70 after passing through passages 59 and 23 until each nail 21 is positioned in coaxial position beneath plunger 14.

Upon the descent of plunger 14 when trigger 38 is pulled, plunger end 52 will press upon the fastener head and nailing strip portion immediately beneath and against the edges of arcuate die defining opening 68 causing the plunger to shear through the nailing strip against the predetermined resistance of its metal, shown in outline in FIGURE 6, and drive the fastener 21 home into the workpiece in one blow, along with the portion of the nailing strip itself sheared off between end 52 and the cooperating edge of die opening 68. The remainder of the strip 20 will move forwardly out of the driver through the front of groove 70 and passage 60 as successive nails are advanced to a position beneath plunger 14. Feeding of a new nailing strip into guide die 57 is facilitated by the rearwardly flaring opposed surfaces 67 and 72 and the slides 71 of groove 70.

Feeder subassembly 18 includes an adjustable exteriorly threaded double-ended stop nut bushing 73 held in a selected position by a set screw 74. Nut 73 engages a drilled opening 75, which is threaded at the rear end of feeder cylinder 47, a longitudinally drilled hole 76 through the outer end of bracket 17 facilitating the machining operation for the manufacture of the feeder portion of the driver. Nut 73 is provided with a bushing opening through which the reduced rearward portion of a piston rod 77 slidably extends, a shoulder portion 78 on rod 77 limiting rearward movement of piston 48 to which the rod 77 is rigidly connected. The rear end of rod 77 is circumferentially recessed at 79 to permit the forked rear bent end of a feeder bar 80 to engage the groove so that reciprocable movements of rod 77 correspondingly reciprocate feeder bar 80. The forward limit of movement of bar 80 occurring when the upright at bend end of bar 80 abuts the rear face of nut 73.

Piston 48 is provided with a piston ring 81 in the form of an O-ring to engage the sides of cylinder 47 and is biased forwardly toward the head end of the cylinder by a spring 82. Feeder bar 80 is made of spring steel and has a forward reach which terminates in a pair of downwardly extending laterally spaced pusher prongs 83 at the front end thereof. Such prongs are adapted to enter a slot 84 in strip 20 and press against the leading transverse edge of such slot when the nailing strip 20 is moved forward a single feeding step. The back edges of the prongs 83 are provided with a smooth slope 85 so that upon rearward movement of piston 48, by admission of pressure air to passage 46, the plunger 83 withdraws from such slot and slides rearwardly over the nailing strip to the next succeeding slot to the rear into which the prongs 83 drop preparatory to the succeeding feeding stroke under the influence of spring 82 when feeder passage 46 is opened to exhaust through a port 86 by valve assembly 37.

Bracket 17 is provided with two opposed pairs of horizontal inwardly extending lugs 87 and 88, such pairs being longitudinally spaced and adapted to provide a slideway for upper lateral flanges 89 of magazine 19. Magazine 19 may be made of extruded aluminum and is provided with longitudinally extending spaced vertical sides 90 defining a channel passage 91 therebetwen for nail shanks rearwardly of and in aligned registry with passage 23. A flat flange base 92 is provided on magazine 19, the bottom face of which is coplanar with the bottom of nose 16. The forward end of magazine 19 is vertical and engages a vertical rear face on nose piece 16 as shown in FIGURE 7. One of the flanges 89 is provided with a recess 94 so that when the magazine is in position, such recess will be engaged by a spring clip 95 connected to bracket 17 releasing to latch the magazine 19 in place in driver 10. After a nailing strip 20 has been used up, a new nailing strip 20 is inserted into place by pushing it along a longitudinal slide groove 96 in the top of magazine 19 with the shanks of the nails 21 extending into the space 91, preparatory to commencement of a further series of nailing operations as trigger 38 is successively pulled; or a relatively endless coil of nails or other fasteners may be fed into and along the groove 96 of magazine 19. Thus, while it is not necessary to remove magazine 19 to insert a new strip 20, the magazine preferably is made as a separate removable part for convenience, economy, assembling and disassembling purposes.

Control valve assembly 37 comprises a cylindrical valve sleeve 97 fixed in a drilled opening 98 therefor in an enlarged portion of rib 34 at the front of handle 22. A retainer ring 100 engages a groove at the bottom of the opening 98 and a Welsh plug 101 engages body 11 at the top of the opening to fix sleeve 97 in position. Sleeve 97 is provided with external annular grooves 102, 103 and 104, reading from top to bottom, and with O-ring seals 105 respectively therebetween. A pair of drilled ports respectively numbered 102a, 103a and 104a communicate with the respective annular openings 102, 103 and 104. Sleeve 97 is provided with an upper chamber 106 and a lower chamber of like diameter 107, a narrower passage 108 joining chambers 106 and 107. The annular edge in chamber 106 around passage 108 forms a seat for a valve disk on the underside of an upper valve head 109 while the annular edge in chamber 107 around passage 108 forms a seat for a valve disk in a lower valve head 110. The ports 102a admit compressed air to the bottom of chamber 106; ports 103a admit compressed air to a branch passage 111 when valve head 109 is unseated, thereupon supplying compressed air to the driving passage 35 and feeder passage 46; and ports 104a connect passages 111 and 108 to exhaust port 86 whenever lower valve head 110 is unseated. The valve heads are rigidly connected by a valve stem 112, the bottom end of which is adapted to be engaged by trigger 38 when it is pulled or lifted to raise valve heads 109 and 110, thereby seating head 110 and unseating head 109. Conversely, when the pressure on trigger 38 is released, the valve will return to its at rest position shown in FIGURES 1 and 2 because although the heads are of approximately the same diameter, the space between the top of valve head 109 and Welsh plug 101 acts as a pressure chamber to "crack" lower valve head 110 away from its seat when trigger 38 is released, thereupon opening chamber 107 to exhaust (and atmosphere) and causing upper valve head 109 to reseat itself to await the next triggering action. If desired a biasing spring may be inserted in such space to bias head 109 toward its closed, seated position.

The operation of pneumatic driver 10 is clear from the foregoing description and may be summarized at this point by starting with driver 10 in an at rest position shown in FIGURE 1 with compressed air from hose 44 present in chamber 41 and passage 41a, annulus 102, return passage 40 and annulus 29 to press against flange 13b of piston 13 to maintain the piston in its retracted position with plunger 14 clear of the nailing strip 20 and nail immediately therebeneath in guide die 57. In this at rest position, the seated valve disk in head 109 prevents the admission of compressed air to passage 108 surrounding the valve stem and driving passage 35 and feeder passage 46 are open to exhaust through passage 111, annulus 103, ports 103a, passage 108, chamber 107, ports 104a, annulus 104 and exhaust port 86; and spring 82 has moved and presented a succeeding portion of the nailing strip and a succeeding nail into readiness position beneath plunger 14, as shown.

Upon lifting trigger 38, annular chamber 29 remains subject to the compressed air pressure, but the valve is lifted unseating head 109 and seating head 110 to open passage 108 to the compressed air pressure and closing off chamber 107 and exhaust port 86 from communication with passages 108 and 111. Compressed air admitted to passage 108 when the valve is lifted passes through the passages 111, 35 and 46 with a resulting virtually immediate downward movement of piston 13 to press the end 52 of plunger 14 against the head of the nail immediately therebelow and hold it against rearward movement an instant before piston 48 and rod 77 are extended to the rear against the force of spring 82 to withdraw the prongs 83 from the slot 84 immediately behind the nailhead against which plunger 14 is pressed. Such retraction of feeder bar 80 causes prongs 83 to engage the next following slot 84 preparatory to a feeding stroke when feeder passage 46 is subsequently opened to exhaust through the valve and port 86. Plunger 14 pauses imperceptibly as it shears the nailing strip and then accelerates extremely fast under the volume of compressed air in recess 28 to drive the nail beneath plunger 14 home in a workpiece such as a wooden board 113, with the head flush with the surface of stud 113 against which driver 10 is held or set a predetermined amount inwardly of such surface, as desired. For example, if the nailing strip material is made of one thickness of metal to drive a nail flush, a slightly greater thickness of metal will provide a greater kinetic energy potential in recess 28 for a somewhat greater driving force to achieve a deeper setting of the nail in the board. Moreover, in such driving, the acceleration of the nail into the workpiece will be so fast that the driver 10 and the user thereof will not be pushed away from the work or the head of the nail being driven while the nail is penetrating the wood to the selected extent.

Normally, the driving stroke will take place so fast that the trigger 38 will not be released by the person operating the driver 10 until after plunger 14 has reached the extremity of its extended or driving stroke. Such driving stroke will meet with no significant resistance between the bottom of cylinder 12 and bottom 13a of piston 13 and the force and speed of such driving stroke is not impeded by the back pressure in annulus 29. At the bottom of its driving stroke, bottom 13a of the piston will be snubbed by bumpers 33. Upon the release of trigger 38, the valve returns to the position shown in FIGURE 2 and the passages 35 and 46 are opened to exhaust, whereupon the piston 13 is quickly retracted under the force in annulus 29 and returns to the position shown in FIGURE 1; and piston 48 and rod 77 will be retracted by spring 82 causing a feeding of the next succeeding nail 21 which, assuming it happens as plunger 14 is still rising, will cause the center of nailing strip 20 to abut against the smooth side of plunger 14 which will continue to slide by until end 52 is above the nailing strip and the next nailhead so that they can complete the feed movement into readiness position beneath plunger 14 under the influence of spring 82.

In FIGURES 10 and 11, a spacer 114 is illustrated having a planar upper face in engagement with the planar bottom face 53 of nosepiece 16 and base 92 of magazine 19 to which it may be closely held by a chevron-recessed hook 115 engaging the diamond-point front flange of the nose 16 and side clips 116 engaging the flanges of base 92. Spacer 114 is provided with an opening 117 for end 52 in registry with passage 54 and by means thereof, without making any change in the shear resistance of nailing strip 20, the instantaneous driving blow delivered by piston 13 and plunger 14 may be selectively varied by controlling the thickness of spacer 114 to vary inversely the distance which end 52 will project at the extremity of its driving stroke. Thus, with spacer 114, as shown in FIGURE 10, such projection of end 52 is somewhat less than it is when spacer 114 is removed from driver 10. A consequence is that with spacer 114, a workpiece may be made of a more fragile material such, for example, as gypsum board in which the nail may be driven flush without breaking or mashing the exterior surface of the gypsum board. Normally, spacer 114 will not be used when driver 10 is used to drive nails into wooden studding, floors, or joists, or frame in building constructions, or into wood or other such nailable substances for crating, cabinet making, or other purposes.

A further embodiment of this invention for a fastener driver is illustrated in FIGURES 12 to 15 and parts of that further embodiment corresponding generally in construction and functioning to parts in the above-described embodiment are provided with the same reference numerals, respectively, with the addition of a prime accent thereto. In driver 10', valve subassembly 37' comprises a trigger valve subassembly 37'a and an automatic valve subassembly 37'b; feeder subassembly 18' is resiliently biased to retract the feeder bar 80' in a non-feeding direction. The bottom of cylinder 12' has shoulder 121 to seat a cylindrical head 32' on nose piece 16', the respectively cylindrical surfaces of which in engagement are each provided with a semicircular groove for an arcuate locking wire 122 to be slid thereinto through an opening therefor in the side of body 11'.

Bracket 17' is provided with an extension feeder passage 46'a to one side of a vertical opening 125 through the bracket. A threaded stop 126 is mounted in a tapped hole in partition 127 in bracket 17' and held in its adjusted selected position by a lock nut 128 to limit the forward or feeding stroke of piston rod 77' and feeder piston 48'. Piston 48' is reciprocable in bore 47' between the front end of the bore and a retainer stop ring 129. The rear end of bore 47' in bracket 17' comprises a pressure chamber 47'a closed by a Welsh plug 130 at the rear thereof. Chamber 47'a is in communication with passage 46'a and feeder passage 46' and receives compressed air when driver 10' is in its at rest position shown in FIGURE 12, as does the annular space 29' to hold piston 13' in its retracted position ready for a new cycle of operation upon the lifting or pulling of trigger 38'.

Valve subassembly 37'a is similar in construction and operation to subassembly 37 in the prior described embodiment except that head 109' is smaller than head 110' and, further, that in the further embodiment, subassembly 37'b is an automatic reciprocable valve subassembly interposed as an auxiliary control for return passage 40' and for feeder passage 46' which in the further embodiment branches off from passage 40' rather than being in communication with driving passage 35'.

Subassembly 37'b is mounted in the lower end of a drilled opening 132 in body 11' and is provided with a tubular valve sleeve 133 held in position by a retainer ring 134. The lower end of sleeve 133 is closed except for a guide opening 135 therethrough for a lower end of a stem of a reciprocable valve 131. Sleeve 133 is provided with O-rings 136 to seal the outside thereof relative to the surface of opening 132 and has an annular passage 137 in communication with a passage 40'a, an annular passage 138 in communication with the valve interior 139 and connecting passage 40' and an annular passage 140 are provided. Annular passage 137 is connected by opposed ports 137a to an upper valve chamber 141 having a valve seating shoulder 141a while the annular passage 140 is connected by like ports 140a to a lower valve chamber 142 having a valve seating shoulder 142a. The annular passage 138 is connected by ports 138a to the interior valve passage 139. The automatically reciprocable valve 131 has an upper differential head 143 with a valve disc 143a at the bottom thereof to cooperate with seat 141a and an O-ring seal 144, and, a lower valve head 145 having a valve disc 145a to cooperate with seat 142a. The valve heads are held in fixed spaced relation to each other by a valve shaft 112'.

In the operation of the further embodiment, when trigger 38' is lifted unseating head 109' and seating head 110', compressed air passes through the interior of the valve assembly 37'a and exits through driving passage 35', 132 and 36' to build up potential kinetic energy in recess 28' to cause plunger 14' to shear through nailing strip 20' and snap drive the nail beneath the plunger into the work object in a single stroke. During such admission of compressed air with head 109' lifted, the larger area above the top of head 143 causes the disc 143a to seat against 141a against the annular pressure on the underside of that head in chamber 141 which is open to passage 40'a, and, unseats head 145 which opens the passage 40' and thereby the return passage 29' and feeder passage 46' are connected to exhaust port 86' through annulus 140 and ports 140a. Thus, during this driving portion of a single cycle, there is no pressure in annulus 29' or chamber 47'a causing feeder bar 80' to return to its retracted position shown in FIGURE 14 under the influence of spring 82' to ready it for the next feeding stroke. There is enough lag in the operation of automatic valve 131 upon pulling trigger 38' to enable end 52' to engage the nailhead immediately thereabeneath before piston 48' is retracted by spring 82' with the result that nailing strip 20' is not dragged back by the prongs 83' on bar 80'.

As long as trigger 38' is held up, plunger 14' will remain in the extended position shown in FIGURE 14, However, as soon as it is released, valve heads 110' and 109' will drop and connect recess 28' to exhaust 86' through passages 36', 132, 35', 108', ports 104a' and annulus 104; and when the pressure in the space above head 143 goes down, the pressure on the underside of head 143 will unseat the disc 143a and seat disc 145a, thereby admitting compressed air from passage 41' through the interior passage 139 to the ports 138a, annular passage 138 and passage 40' to place annulus space 29' and feeder passage 46' and 46'a under pressure to quickly return piston 13' to the top of its stroke and extend piston rod 77' in a feeding direction due to the pressure in chamber 47'a against piston 48' to make it overcome the pressure of spring 82'. The upward movement of the piston 13' is fast enough coupled with the lag in the extension of piston 48' so that when the plunger 14' will be up when the next nail 21' slides into guide die 57' when rod 77' is stopped by stop 126 in indexed relation and the next nail in strip 20' comes to rest under bottom 52'. The plunger 14' will remain up until the trigger 38' is again pulled.

One form of nailing strip which may be utilized in the above-described embodiments is shown in United States Patent No. 2,784,405, although other provision for supplying nails or other fasteners in successive alignment may be made for use with drivers embodying the principles of this invention. Further, such drivers may be constructed with other means for gripping or holding them for operative use involving either manual or non-manual actuation, as desired. And, still further uses of drivers of this invention may be made other than in connection with the driving of fasteners.

Driver embodiments of this invention may be manufactured by mass production methods on an interchangeable part basis. Such drivers will be of relatively low height and yet at the same time will provide sufficient volume of elastic pressure fluid on the driving side of the piston so that upon initiation of a driving action the kinetic energy potential of that pressure fluid will drive that piston home in a single driving stroke. Such driving stroke will be accomplished without significant resistance thereto and, moreover, the piston will be returned by positive air pressure before it is desired to initiate another driving stroke and such return will be accomplished at the expenditure of a relatively small volume of compressed air. Such positive return by a pressure fluid, further, eliminates fatigue of the kind which developed in prior spring return devices. Still further, valve and other mechanism of constructions of this invention are relatively uncomplicated and provide positive feeding with a relatively short feeding stroke. Drivers of this invention will not "run away" because they do not automatically cycle through inasmuch as the trigger in the illustrated embodiments must be pulled each time a new nail or fastener is to be driven. Despite the relative light weight and compactness of constructions of this invention larger nails are easily driven by a single blow and constructions may be provided to be held by two hands for the driving of still larger fasteners such as spikes. At the same time, the new drivers may be utilized close to corners and walls extending at an angle to the surface into which a fastener is to be driven by one of our new drivers.

Various changes may be made in aspects of the illustrated embodiments and other embodiments provided without departing from the spirit of this invention or the scope of the appended claims.

We claim:

1. A pneumatic driver comprising, in combination, a cylinder having a lower bore of one diameter and an upper counterbore of larger diameter, a double acting piston reciprocable in both of said bores, an annular flange extending between said piston and said counterbore, said larger diameter bore defining an annular chamber exteriorly of said piston below said flange, the area of said flange being smaller than the area of said bore, said piston having a cylindrical wall defining an internal recess in the top of said piston with unrestricted access to the top of said cylinder and said counterbore above said flange, said wall separating and preventing communication between said recess and said annular chamber at all times, a feeder mechanism reciprocable substantially at right angles only to the axis of said lower bore, a driving member connected to said piston, said lower bore having means in the lower portion thereof to vent the space below said piston, a port in said cylinder above the uppermost position of said piston, a further port substantially positioned in the lower part of said annular chamber below the lowermost position of said flange, movable means to admit pressure fluid to said first-named port in one position of said means to move said piston in a driving stroke and to exhaust pressure fluid from said annular chamber through said second-named port, means operatively associated with said valve means to move said feeder mechanism in a non-feeding direction during said driving stroke and in a feeding direction upon return of said valve means to a normal return position from said one position, a trigger adapted to be pressed and operatively associated with said valve means to move said valve means to said one position, means for automatically returning said valve means to a normal return position from said one position when said trigger is not pressed, said valve means in normal return position operatively connecting the space above said piston to exhaust and said annular chamber to a source of said pressure fluid.

2. In a pneumatic driver for fasteners or the like, comprising, in combination, a cylinder having a bore, a piston in reciprocable engagement with said bore, a generally coaxial downwardly extending plunger rigidly connected to said piston, a support fastened to the lower portion of said cylinder and having a coaxial plunger passage therethrough, a coaxial guide fixedly positioned in the upper portion of said support in spaced relation to said cylinder such that in the upper position of said plunger the bottom thereof is within an upper portion of said guide, means to feed a fastener in a succession relatively resistant to separation into position below said plunger when said plunger is in said upper position, said plunger passage having a height at least equal to the height of said fastener, die means in a lower spaced portion of said guide to cooperate with said plunger to separate said fastener from said succession, valve means adapted to be moved to one position to admit pressure fluid to said cylinder on the upper side of said piston to move said piston downwardly in a driving stroke and adapted to be moved to a normal return position from said one position to cut off said admission of pressure fluid, means to admit pressure fluid to said cylinder and an underside portion of said piston to move said piston in a return stroke when said valve means are in said normal return position, spacing means to selectively vary the distance between the bottom of said support and the bottom of said plunger in its upper position to vary inversely the projection distance of said plunger on a driving stroke of said plunger, and means for fastening said spacing means against the underside of said support.

3. A pneumatic driver for fasteners or the like, comprising, in combination, a cylinder, a reciprocable substantially hollow free piston having a larger driving area on one side thereof and a smaller return area on the other side thereof, a pneumatic positive pressure chamber, means connecting said respective areas to said pressure chamber, a driving member connected to said piston to drive fasteners or the like, a guide in constant engagement with at least the lowest end of said driving member, reciprocable stroke straight line feeder mechanism for intermittently feeding a succession of detachably connected fasteners or the like beneath said driving member substantially at right angles thereto, said succession being relatively resistant to separation of a fastener therefrom, means connecting said feeder mechanism to said pressure chamber, a valve control operatively connected to said respective means to cause said driving member and feeder mechanism to move through a single full stroke in one direction of each thereof in one position of said control and to cause said driving member and feeder mechanism to move through a return stroke in the opposite direction in another position of said control, both of said strokes of said piston being produced by positive pneumatic pressure through operative connection with said pressure chamber and at least one of said strokes of said feeder mechanism likewise being so produced, said control comprising an auxiliary valve, a trigger valve and a trigger, means for automatically returning both of said valves to a normal position when said trigger is not pressed, said valves in normal position operatively connecting said driving area to exhaust and said return area to said pressure chamber, and, conversely, when said trigger is pulled, operatively connecting said driving area to said pressure chamber and said return area to exhaust.

4. In a pneumatic driver for fasteners or the like, apparatus comprising, in combination, a cylinder having a bore of one diameter and a coaxial bore of a larger diameter, a piston in reciprocable engagement with both of said bores, said larger bore defining an annular chamber between said bore of one diameter and a portion of the exterior of said piston, said annular chamber having a cross sectional area which is a fraction of the cross sectional area of said bore of one diameter, said piston having an internal hollowing recess in the top of said piston, a coaxial downwardly extending plunger rigidly connected to said piston, a nosepiece affixed to the bottom of said cylinder and providing a coaxial passage therethrough for said plunger, said passage further extending laterally through the rear of said nosepiece, a coaxial plunger guide die immovably mounted in the upper part of said nosepiece, said guide die further having upper and lower blocks together defining an aligned passage thereinto for a strip of fasteners relatively resistant to separation, a magazine support for said strip of fasteners positioned in rearward registry with said nosepiece, means for removably connecting said support to said cylinder, means for intermittently feeding said strip to position successive fasteners therealong within said guide die in coaxial relation to said plunger when said plunger is in its upper position, valve means movable to admit compressed air to the top of said cylinder and said recess to move said piston and plunger in a driving stroke, means for automatically admitting compressed air to said annular chamber to return said piston and plunger to their upper position when said valve means are released, a spacer member of selected thickness to vary the distance between the bottom of said nosepiece and the bottom of said plunger to vary correspondingly the distance said plunger projects in a driving stroke of said plunger, and means for removably attaching said spacer member to the bottom of said nosepiece and support.

References Cited in the file of this patent

UNITED STATES PATENTS

| | | |
|---|---|---|
| 1,753,499 | Burger | Apr. 8, 1930 |
| 2,205,690 | Green | June 25, 1940 |
| 2,219,739 | Duncan | Oct. 29, 1940 |
| 2,421,474 | Alter | June 3, 1947 |
| 2,445,674 | Kendall | July 20, 1948 |
| 2,765,468 | Cootes | Oct. 9, 1956 |
| 2,784,405 | Working | Mar. 12, 1957 |
| 2,818,570 | Faccou | Jan. 7, 1958 |
| 2,881,738 | Baker | Apr. 14, 1959 |
| 2,918,675 | Smith | Dec. 29, 1959 |
| 2,923,937 | Laucher | Feb. 9, 1960 |
| 2,959,155 | Powers | Nov. 8, 1960 |
| 2,985,139 | Powers | May 29, 1961 |

UNITED STATES PATENT OFFICE

CERTIFICATE OF CORRECTION

Patent No. 3,099,837                     August 6, 1963

George P. Heilman et al.

It is hereby certified that error appears in the above numbered patent requiring correction and that the said Letters Patent should read as corrected below.

Column 4, line 65, for "therebetwen" read -- therebetween --; line 74, for "releasing" read -- releasably --; column 8, line 25, for "14," read -- 14. --; column 9, line 40, after "movable" insert -- valve --.

Signed and sealed this 31st day of March 1964.

(SEAL)
Attest:
ERNEST W. SWIDER

Attesting Officer

EDWARD J. BRENNER

Commissioner of Patents